Sept. 1, 1925.
J. B. HAWLEY, JR
1,552,155
ELECTROMAGNETIC TRANSMISSION AND THE LIKE
Filed March 12, 1923
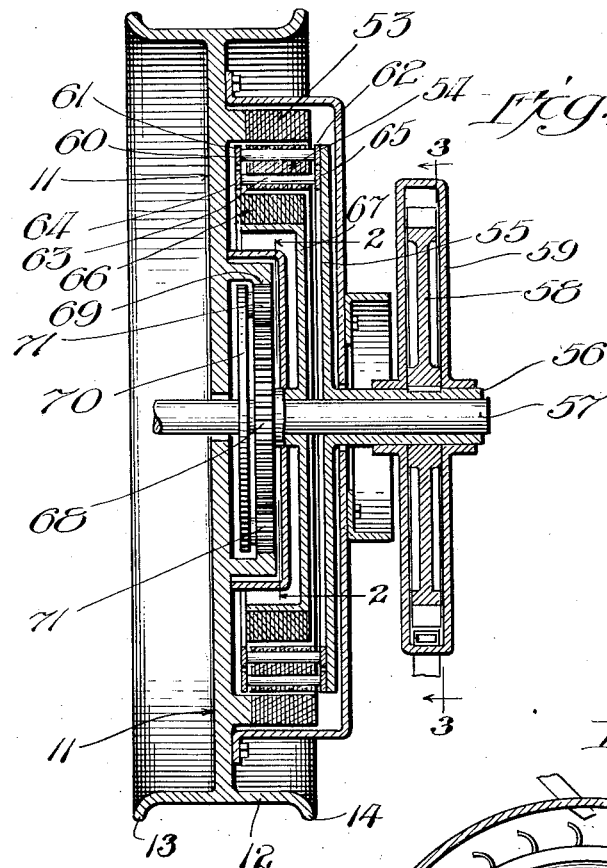
Fig.1.
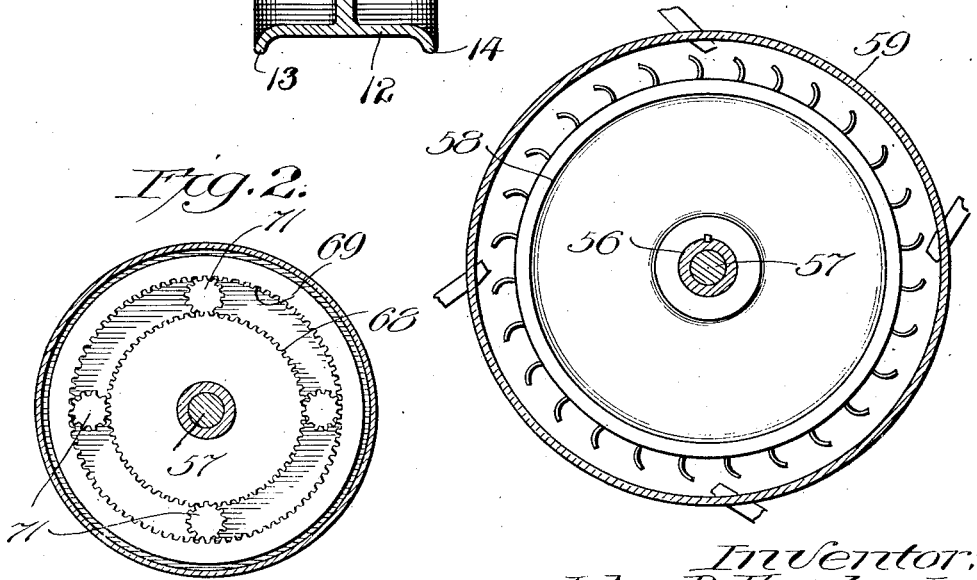
Fig.2.
Fig.3.
Inventor:
John B. Hawley, Jr.
Attys Patented Sept. 1, 1925.

1,552,155

UNITED STATES PATENT OFFICE.

JOHN B. HAWLEY, JR., OF COLORADO SPRINGS, COLORADO.

ELECTROMAGNETIC TRANSMISSION AND THE LIKE.

Application filed March 12, 1923. Serial No. 624,676.

*To all whom it may concern:*

Be it known that I, JOHN B. HAWLEY, Jr., a citizen of the United States, residing at Colorado Springs, in the county of El Paso and State of Colorado, have invented certain new and useful Improvements in Electromagnetic Transmissions and the like, of which the following is a specification.

This invention has to do with certain improvements in electromagnetic transmissions and the like. The main object of the invention is to provide an improved form of electromagnetic transmission which shall be very well adapted for use in connection with motor vehicles such as automobiles, trucks, tractors and for other similar purposes.

One of the objects of the invention is to provide an electromagnetic transmission operating on the alternating current principle, and in which the variation in speed as between the driving and driven elements is effected in a very simple and convenient manner. In this connection, a further object of the invention is to provide an arrangement in which this control is effected primarily by regulation of the strength of a magnetic field.

A further object of the invention is to provide an arrangement such that the driven element can be very easily reversed in direction.

A further object of the invention is to provide a general construction and arrangement of parts which are peculiarly well adapted for directly driving the wheel of the vehicle by applying the driving force directly thereto, so that it is not necessary to transmit said driving force through any differential mechanism or axle shafts.

A further object of the invention is to provide an arrangement such that the driving force may in the first place be very readily supplied by the use of a turbine driven by steam or otherwise, which constitutes in effect a portion of the transmission mechanism itself, thus incorporating the driving and controlling mechanisms within a very compact and conveniently arranged ensemble.

A further object of the invention is to provide an arrangement such that a very large driving force may be easily developed at a relatively low speed of rotation, so that the mechanism will be peculiarly well adapted for use in connection with such machines as trucks, tractors, and the like.

Other objects and uses of the invention will appear from a detailed description of the same, which consists in the features of construction and combinations of parts hereinafter described and claimed.

In the drawings:

Figure 1 shows a vertical section through a drive wheel having applied thereto a transmission mechanism embodying the features of the present invention;

Fig. 2 shows a section taken on the line 2—2 of Fig. 1, looking in the direction of the arrows; and Fig. 3 shows a section taken on the line 3—3 of Fig. 1, looking in the direction of the arrows.

I will first state that I have chosen to illustrate the figures of the present invention as being applied to a wheel 11 having the rim 12 with the side flanges 13 and 14 for the accommodation of a suitable tire. I have also illustrated this wheel as being of the disk form, since the mechanism to which the present invention relates may be very easily applied to such a wheel; but I wish it distinctly understood that in so illustrating and describing my invention, I do not intend thereby to limit either its construction or applicability of usefulness except as I may hereinafter do so in the claims.

In the arrangement shown in the figures I have made provision for a turbine drive of the wheel 11 through the medium of an electromagnetic form of transmission. In this case the wheel 11 is provided with a rotor 53 having either an A. C. or D. C. winding. A rotor 54 works within the rotor 53, the rotor 54 being carried by a quill 55 carried by a sleeve 56 which is journaled on the stationary shaft 57. The sleeve 56 carries a turbine element 58 working within a housing 59 by means of which the rotor 54 is driven.

The rotor 54 has windings at both its outer and inner surfaces. In the arrangement illustrated, these windings are of the squirrel cage type. The outer winding includes the bars 60 whose ends are short circuited by the rings 61 and 62, and the inner winding includes the bars 63 whose ends are short circuited by the rings 64 and 65.

Within the rotor 54 is located another rotor 66 carried by a quill 67 which is journaled on the shaft 57 and whose inner end carries a gear 68. The wheel 11 has an internal gear 69 opposite to the gear 68. The stationary shaft 57 carries a quill 70 having a series of pinions 71 intermediate between the gears 68 and 79.

With this arrangement upon driving the quill 55 by the turbine 58 and exciting the winding of the rotor 53, the wheel will be driven in the same direction of rotation as the rotor 55. By properly controlling the strength of the current supplied to the winding of the rotor 53, the amount of slip can be controlled.

On the other hand, by exciting the winding of the rotor 66 and stopping the excitation of the rotor 53, the quill 67 will be driven in the same direction as the rotor 54. Owing to the fact that the central gear 68 is then driven by the quill 67 and the quill 70 is stationary, the wheel will in this case be driven in reversed direction.

I wish to point out that while I have provided windings on certain of the rotors herein illustrated and described, which windings are to be supplied with current, this current can be easily supplied to the windings through the necessary slip rings and brushes in accordance with well understood practice.

I claim:

1. An electro-magnetic drive for the wheel of a motor vehicle, comprising, in combination, a field member secured to the wheel, another field member concentric therewith and free to rotate with respect to the wheel, a rotor intermediate between said field members and having squirrel cage windings facing both of the field members, means for driving the rotor by power external to the wheel, and a geared connection between the second mentioned field member and the wheel, substantially as described.

2. An electro-magnetic drive for the wheel of a motor vehicle, comprising, in combination, a field member secured to the wheel, another field member concentric therewith and free to rotate with respect to the wheel, a rotor intermediate between said field members and having squirrel cage windings facing both of the field members, means for driving the rotor by power external to the wheel, and an operative connection between the second mentioned field member and the wheel, substantially as described.

3. An electro-magnetic drive for the wheel of a motor vehicle, comprising, in combination, a field member secured to the wheel, another field member concentric therewith and free to rotate with respect to the wheel, an electro-magnetic rotor intermediate between said field members and having magnetic faces facing both of the field members, means for driving the rotor by power external to the wheel, and an operative connection between the second mentioned field member and the wheel, substantially as described.

4. An electro-magnetic drive for the wheel of a motor vehicle, comprising, in combination, a field member secured to the wheel, another field member concentric therewith and free to rotate with respect to the wheel, an electro-magnetic rotor intermediate between said field members and having magnetic faces facing both of the field members, means for driving the rotor by power external to the wheel, and means for selectively energizing the faces of the rotor, substantially as described.

JOHN B. HAWLEY, Jr.